United States Patent [19]

Belamiza

[11] Patent Number: 4,923,157

[45] Date of Patent: May 8, 1990

[54] SIGNPOST SUPPORT BRACKET

[76] Inventor: Alexander Belamiza, 8717 Birch Dr. #323, LaVista, Nebr. 68128

[21] Appl. No.: 264,540

[22] Filed: Oct. 31, 1988

[51] Int. Cl.[5] .............................................. F16M 11/24

[52] U.S. Cl. .................................... 248/188.2; 40/607; 248/156; 248/508; 248/545

[58] Field of Search ...................... 248/188.2, 507, 508, 248/544, 545, 469, 156; 40/607

[56] References Cited

U.S. PATENT DOCUMENTS

| | | | |
|---|---|---|---|
| 3,441,239 | 4/1969 | Frost | 248/545 |
| 4,249,715 | 2/1981 | Repp | 248/545 |
| 4,402,166 | 9/1983 | Wortham, Jr. | 248/156 X |
| 4,483,506 | 11/1984 | Litwiller | 248/545 |
| 4,717,110 | 1/1988 | Fohrman | 248/545 |
| 4,790,092 | 12/1988 | Farmer | 40/607 |

FOREIGN PATENT DOCUMENTS

| | | | |
|---|---|---|---|
| 0250025 | 11/1962 | Australia | 248/545 |

*Primary Examiner*—Ramon O. Ramirez
*Attorney, Agent, or Firm*—John A. Beehner

[57] ABSTRACT

A signpost support bracket includes a generally L-shaped ground bracket having a ground engaged horizontal leg and an upstanding leg adapted for detachable securement to the lower end of a signpost. An elongated ground spike is driven through a hole in the horizontal leg to rigidly secure the bracket and signpost relative to the ground. The ground spike hole is space sufficiently from the signpost and upstanding leg of the ground bracket to provide vertical clearance above the spike for driving the spike into the ground.

13 Claims, 3 Drawing Sheets

SIGNPOST SUPPORT BRACKET

BACKGROUND OF THE INVENTION

The present invention is directed generally to a signpost support bracket and more particularly to a bracket that facilitates the installation and removal of sign from hard frozen ground without damage to the sign.

In the real estate profession, it is very difficult for realtors, and women in particular, to drive the "FOR SALE" signs into hard ground. This is a particular problem in the winter when the ground is frozen. The present invention eliminates the need to use one's body weight or other heavy objects for forcing a sign into the ground which objects frequently damage the sign. Similarly, the removal of a sign from very hard ground can be an equally burdensome task.

The problems of temporarily installing sign posts and the like are not limited to the real estate profession. Construction signs, builder signs, decorative lantern poles and temporary fence posts are all similarly difficult to install and remove when ground conditions are not favorable.

Accordingly, a primary object of the invention is to provide an improved signpost support bracket.

Another object of the invention is to provide a signpost support bracket which may be easily installed in hard frozen ground.

Another object of the invention is to provide a signpost support bracket which is readily removable from the and from the ground without damage to the sign or substantial force by the operator.

Another object is to provide a signpost support bracket which is of compact size for easy handling storage and transport of many brackets together.

Another object is to provide a signpost support bracket which is adaptable for stable support of a sign even on very soft ground.

Another object is to provide a signpost support bracket which is simple and rugged in construction, economical to manufacture and efficient in operation.

SUMMARY OF THE INVENTION

The signpost support bracket of the present invention includes a generally L-shaped ground bracket including a generally horizontal leg adapted for engagement with the ground and an upstanding leg adapted for securement to the lower end of a signpost. An elongated ground spike is driven through a ground spike hole in the horizontal leg to rigidly secure the ground bracket and signpost relative to the ground. The ground spike hole through the horizontal leg is spaced from the upstanding leg in clearance relation from a sign post secured to the upstanding leg so that vertical clearance is available for driving the spike into the ground and for removing the spike from the ground.

A preferred means for securing the lower end of a signpost to the upstanding leg of the ground bracket is to provide a separate post bracket having a upright leg with a pair of generally U-shaped collars extended horizontally therefrom and vertically spaced apart relation. A fastener hole is provided through the upright leg and another through the upstanding leg of the ground bracket so that an elongated fastener may be inserted through the signpost post bracket and ground bracket for rigid securement of the post to the bracket. The fastener hole in either the post bracket or ground bracket is preferably a vertical elongated slot to accommodate vertical and rotational adjustment of the post bracket relative to the ground bracket.

Each U-shaped collar may be covered with a flexible closure seal that is slit for receiving a round, square, L-shaped or other shaped signpost into and through the collar. The ground spike and ground spike hole in the horizontal leg of the ground bracket may be formed with matching non-circular cross sectional shapes for a more stable securement to the ground. The spike is preferably formed as a double headed spike to facilitate removal.

DESCRIPTION OF THE PREFERRED EMBODIMENT

Figure 1:
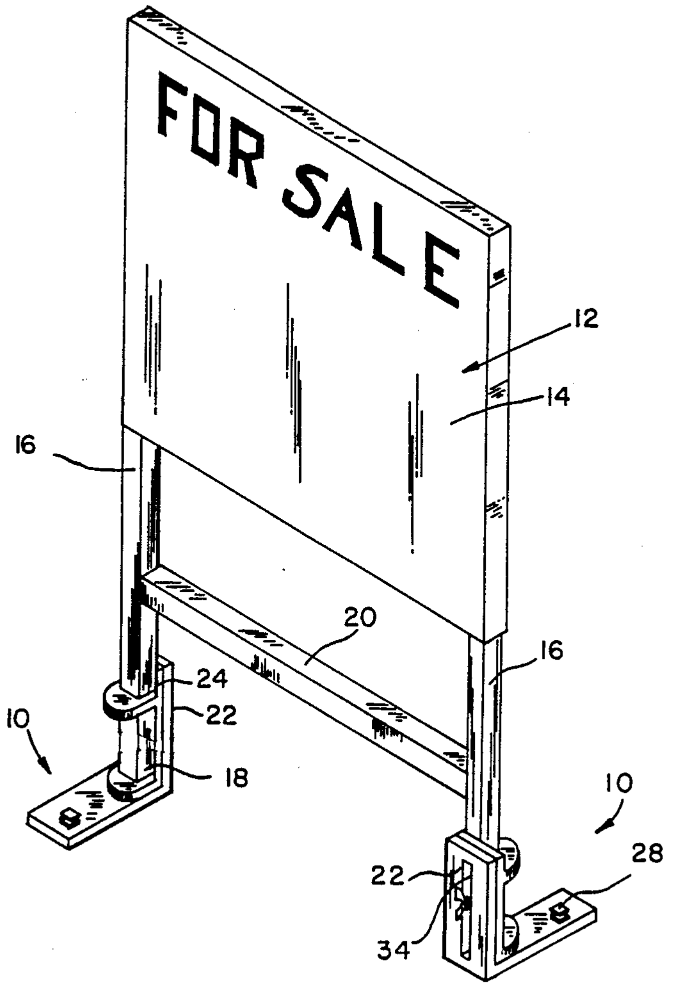
FIG. 1 is a perspective view of a sign having a pair of sign posts supported by the signpost support bracket of the invention.

A pair of the signpost support brackets 10 of the present invention are illustrated in FIG. 1 in assembly relation with a "for sale" sign 12 having a display surface 14 extended across a pair of upstanding signposts 16, each having a lower end 18 and across brace 20 extended between them. The signposts 16 may be round, square, L-shaped or of any other cross sectional shape.

Figure 2:
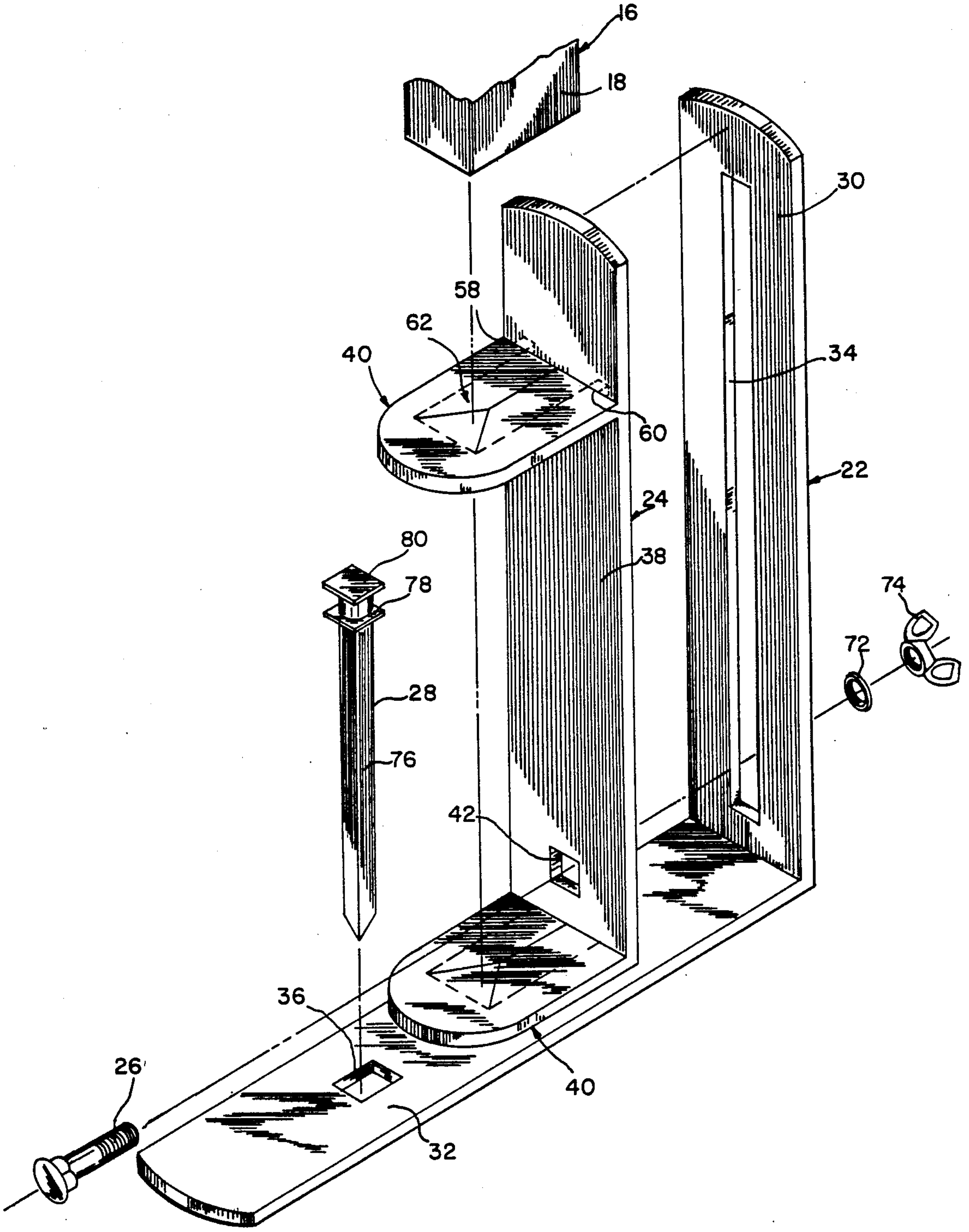
FIG. 2 is an enlarged exploded perspective view of the sign post support bracket of the invention.

Referring to FIG. 2, each signpost support bracket 10 includes a generally L-shaped ground bracket 22, an upright post bracket 24, a signpost fastening bolt 26 and a ground spike 28.

Referring to FIG. 2, the L-shaped ground bracket 22 includes an upstanding like 30 and a generally horizontal leg 32 inclined perpendicularly to the upstanding leg for flush engagement onto the ground. Both legs are preferably integrally formed from a single flat plate having a bend at the junction of the legs. The upstanding leg 30 has a vertically elongated slot 34 and a horizontal leg 32 has a ground spike hole 36 formed therein. Whereas dimensions are not critical to the present invention, a suitable ground bracket has an upstanding leg height of $6\frac{1}{2}$", a horizontal leg length of $5\frac{1}{2}$" and a width of $1\frac{1}{2}$". The elongated slot 34 may be $\frac{3}{8}$" by $4\frac{7}{8}$" and the ground spike hole 36 may be $\frac{3}{8}$" square to accommodate a matching spike 28 having a square cross sectional shank of $\frac{1}{4}$" width.

To mount the signpost on the upstanding leg 30, the post bracket 24 is provided which has an upright leg 38 and a pair of signpost receiving collars 40 extended generally horizontally from the post bracket 24 and vertically spaced apart relation. A fastener hole 42 through upright leg 38 is alignable with the vertical slot 34 and the ground bracket leg 30 for easily securing a signpost 16 and both brackets together.

Figure 3:
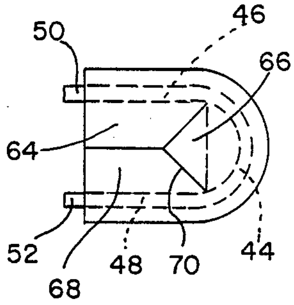
FIG. 3 is a top plan view of a U-shaped collar of the post bracket.
Figure 4:
FIG. 4 is an elevational view of the collar.
Figure 5:
FIG. 5 is a plan view of the collar prior to being formed into the U-shaped.

The collar 40, as illustrated in FIG. 3–5, includes a cross bar 40 connected to and extended between a pair of generally parallel legs 46 and 48 having free end portions 50 and 52 which are insertable into aligned holes 58 and 60 in the post bracket upright leg 38. The cross bar 44 and legs 46 and 48 are preferably molded within a flexible closure seal 62 having flaps 64, 66, and 68 formed by a Y-shaped slit 70. Whereas free end portions 50 and 52 and aligned holes 58 and 60 are illustrated in FIG. 2 only in connection with upper collar 40 it is understood from the above description that lower collar 40 is of identical construction and mounted with identical aligned holes.

Again, whereas dimensions are not critical, suitable collars 40 protrude about $1\frac{1}{2}''$ out from upright plate 38 and have approximately the same width as the upright plate. The flaps 64 of seal 62 afford a resilient engagement with a signpost inserted therethrough for a secure grip on the signpost without marring the finish and scrapping paint therefrom. FIG. 5 illustrates that the U-shaped collar 40 can be formed from an elongated member having the illustrated shape prior to bending into the U-shape of FIG. 3.

Referring again to FIG. 2, the fastening bolt 26 may be provided as a $\frac{3}{8}''$ by $\frac{3}{4}''$ carriage bolt in the preferred embodiment and have a $\frac{3}{8}''$ washer 72 and wingnut 74 for securing it in place.

The ground spike 28 has a shank 76 of $\frac{1}{4}''$ width to assure ready placement through the $\frac{3}{8}''$ square ground spike hole 36. Spike 28 is double headed as at 78 and 80 to facilitate removal of the spike using a conventional hammer or any other tool for readily grasping the exposed head 80 which rests in clearance relation above head 78.

In operation, the lower end of a signpost 16 is readily inserted through the aligned collars 40 of post bracket 24 deflecting the resilient flaps 64, 66, and 68 downwardly. By sliding the post bracket on the signpost, the flaps of the lower collar can be inverted to enable engagement of the lower collar against the horizontal leg 32 of the ground bracket, if desired. The post bracket 24 is vertically and rotationally adjusted relative to the ground bracket 22 while maintaining the bolt hole 42 with a slot 34 in ground bracket 22 whereupon bolt 26 is inserted through the aligned holes and secured in place by washer 72 and nut 74. The dual collars provided on post bracket 24, secure the post to the ground bracket. The post and bracket assembly can then be placed onto the ground at any desired location whereupon spike 28 can be driven through spike hole 36 with a conventional hammer, small sledge hammer or the like. The position of the spike hole 36 in horizontal clearance relation from the collars 40 affords ample vertical clearance above the spike to enable swinging movement of a hammer for driving the spike into hard frozen ground without excessive effort on the part of the operator. Removal of the sign from the ground simply requires the use of a claw hammer or the like to engage the top head 80 of double headed spike 28 to readily withdraw it from the ground. Removal of the bracket 10 from the signpost 16 simply requires sliding the signpost out of the bracket collars 40.

Figure 6:
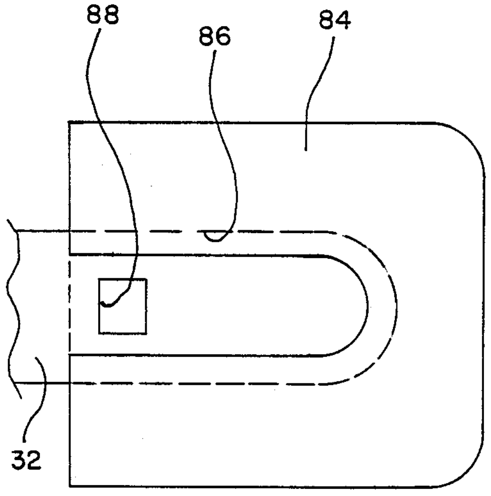
FIG. 6 is a top plan view of the horizontal leg of the ground bracket with a flexible foot pad installed thereon.
Figure 7:
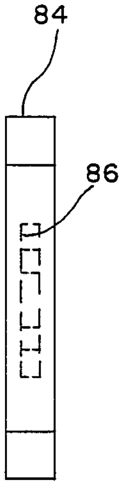
FIG. 7 is an end elevational view of the flexible foot pad of FIG. 6.
Figure 8:
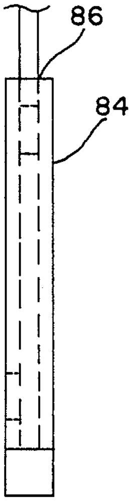
FIG. 8 is a side elevational view of the foot pad and horizontal leg of the ground bracket.

An accessory for the signpost bracket is illustrated in FIG. 6 wherein a foot pad 84 has an elongated slot 86 for receiving the horizontal lower leg 32 of ground bracket 22 so as to substantially increase the effective area of that leg to prevent sinking of the leg into soft ground. Foot pad 84 has a spike hole 88 alignable with spike hold 36 in horizontal leg 32 so that no additional hardware is required for securing the foot pad onto the assembled sign. The foot pad is preferably formed from a plastic resilient plastic material.

Whereas the invention has been shown and described in connection with a preferred embodiment thereof, many modifications, substitutions and additions may be made which are within the intended broad scope of the appended claims. The size of the bracket may be varied, for example, to accommodate signs of different heights and weights. Larger brackets for larger signs will have a proportionately larger spike for increased ground securement. The shape of the post bracket collars may be varied to accommodate various signpost shapes and manufacturing processes. The attachment of the collar legs to the post bracket may also be varied such as by welding the free ends of the legs to the edges of the bracket. Finally, in operation, if a pair of brackets are used for a single sign as illustrated in FIG. 1, it is preferred that the brackets be oriented in opposite but parallel directions perpendicular to the face of the sign for maximum stability.

Thus there has been shown and described a signpost support bracket which accomplishes at least all of the stated objects.

I claim:

1. A signpost support bracket, comprising a generally L-shaped ground bracket including an upstanding leg and a generally horizontal leg adapted for ground engagement, means for securing the lower end of a signpost to said upstanding leg, an elongated ground spike, and said horizontal leg including a ground spike hole therethrough, said hole being of a size and shape to receive said elongated ground spike for securement of said ground bracket into the ground, said hole being spaced from said upstanding leg so as to be positioned in spaced relation from a signpost secured to said upstanding leg whereby vertical clearance is available for driving said spike into the ground.

2. The signpost support bracket of claim 1 wherein said ground spike and ground spike hole have matching noncircular cross sectional shapes.

3. The signpost support bracket of claim 1 wherein said ground spike comprises a double headed spike to facilitate removal.

4. The signpost support bracket of claim 1 wherein said ground bracket upstanding leg and horizontal leg are integrally connected flat plates.

5. The signpost support bracket of claim 1 further comprising foot pad means detachably connected to the horizontal leg of said ground bracket to effectively increase the surface area thereof in contact with the ground.

6. The signpost support bracket of claim 5 wherein said foot pad means comprises a substantially flat pad having a slot therein adapted to receive said horizontal leg and a ground spike hole adapted for alignment with the ground spike hole through said horizontal leg upon insertion of the horizontal leg into said slot whereby the ground spike operates to maintain the foot pad on the horizontal leg.

7. In combination, a signpost having an upper and adapted for connection to a sign and a lower end, a signpost support bracket, comprising a generally L-shaped ground bracket including an upstanding leg and a generally horizontal legal adapted for ground engagement, means for securing the lower end of the signpost to said upstanding leg, an elongated ground spike, and said horizontal leg including a ground spike hole therethrough, said hole being of a size and shape to receive said elongated ground spike for securement of said ground bracket onto the ground, said hole being spaced from said upstanding leg so as to be positioned and spaced relation from the signpost upon securement of said signpost to said upstanding leg whereby vertical clearance is available for driving said spike into the ground.

8. A signpost support bracket, comprising a generally L-shaped ground bracket including an upstanding leg and a generally horizontal leg adapted for ground engagement, means for securing the lower end of a signpost to said upstanding leg, an elongated ground spike, and said horizontal leg including a ground spike hole therethrough, said hole being of a size and shape to receive said elongated ground spike for securement of said ground bracket into the ground, said hole being spaced from said upstanding leg so as to be positioned in spaced relation from a signpost secured to said upstanding leg whereby vertical clearance is available for driving said spike into the ground, said means for securing the lower end of a signpost to said upstanding leg comprising a post bracket having an upright leg and a pair of signpost receiving collars extended generally horizontally therefrom in vertically spaced apart relation, fastener holes through said upright leg and ground bracket upstanding leg, and a fastener insertable through a sign post, post bracket upright leg and ground bracket upstanding leg for rigidly securing them together.

9. The signpost support bracket of claim 8 wherein the hole in at least one of the upright leg and upstanding ground bracket leg comprises a vertically elongated slot for vertical adjustment of the post bracket relative to the ground bracket.

10. The signpost support bracket of claim 8 wherein each collar comprises a generally U-shaped member including a cross member connected to and extended between a pair of generally parallel legs having free ends secured to the post bracket upright leg.

11. The signpost support bracket of claim 10 wherein a collar further comprises a slit flexible closure seal mounted thereon and adapted to be deformed upon insertion of a signpost through the collar to afford a resilient seal between the collar and the signpost.

12. The signpost support bracket of claim 11 wherein said closure seal substantially covers said cross member, collar legs and the opening between said legs.

13. The signpost support bracket of claim 12 wherein said closure seal includes a Y-shaped slit.

* * * * *